(12) United States Patent
Hasegawa

(10) Patent No.: US 9,648,187 B2
(45) Date of Patent: May 9, 2017

(54) SHEET FEED APPARATUS AND SHEET HOUSING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Satoshi Hasegawa, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/612,391

(22) Filed: Feb. 3, 2015

(65) Prior Publication Data

US 2016/0227061 A1 Aug. 4, 2016

(51) Int. Cl.
*B65H 29/04* (2006.01)
*H04N 1/00* (2006.01)
*B65H 7/20* (2006.01)
*B65H 7/14* (2006.01)
*G06K 9/00* (2006.01)
*G06K 9/20* (2006.01)
*G06K 9/32* (2006.01)

(52) U.S. Cl.
CPC .......... *H04N 1/00734* (2013.01); *B65H 7/14* (2013.01); *B65H 7/20* (2013.01); *G06K 9/00442* (2013.01); *G06K 9/209* (2013.01); *G06K 9/3216* (2013.01); *H04N 1/0066* (2013.01); *H04N 1/00615* (2013.01); *H04N 1/00708* (2013.01); *H04N 1/00761* (2013.01); *H04N 1/00771* (2013.01); *B65H 2511/10* (2013.01); *B65H 2701/1131* (2013.01)

(58) Field of Classification Search
CPC B65H 31/20; B65H 2301/13; B65H 2511/10; B65H 2511/182; B65H 2511/232; B65H 2701/113; B65H 2701/1131
See application file for complete search history.

(56) References Cited

U.S. PATENT DOCUMENTS 5,573,236 A * 11/1996 Petocchi .................. B65H 1/00
250/214 PR
6,619,656 B2 * 9/2003 Guddanti ................. B65H 1/04
271/171

(Continued)

FOREIGN PATENT DOCUMENTS

JP 05-105267 4/1993

*Primary Examiner* — Howard Sanders
(74) *Attorney, Agent, or Firm* — Amin, Turocy & Watson LLP

(57) ABSTRACT

In accordance with one embodiment, a sheet feed apparatus comprises a sheet housing section, a guide, an optical sensor, markers and a determination section. The sheet housing section houses sheets. The guide is arranged at a position corresponding to the size of the sheet housed in the sheet housing section. The detection position of the optical sensor varies by interlocking with the guide. The markers, which have different image features corresponding to the sizes, are arranged at the detection position of the optical sensor pre-determined according to the size of the sheet. The determination section determines the size of the sheet housed in the sheet housing section based on a detection result of the optical sensor.

8 Claims, 9 Drawing Sheets

(56) References Cited

U.S. PATENT DOCUMENTS

2011/0260392 A1* 10/2011 Herrmann .............. B65H 31/10
                                                                271/207
2012/0181746 A1*  7/2012 Herrmann ................ B65H 1/00
                                                                271/264

* cited by examiner

FIG.10
| DETERMINATION RESULT | DETECTION VOLTAGE | DENSITY | |
|---|---|---|---|
| SIZE ERROR | V0 | D10 | HIGH |
| A3(297x420) | V1 | D9 | ↑ |
| B4(257x364) | V2 | D8 | ↑ |
| A4-R(297x210) | V3 | D7 | ↑ |
| A4(210x297) | V4 | D6 | ↑ |
| B5-R(257x182) | V5 | D5 | ↑ |
| B5(182x257) | V6 | D4 | ↑ |
| A5-R(148x210) | V7 | D3 | LOW |
| NO CASSETTE | Vcc | - | |
FIG.11
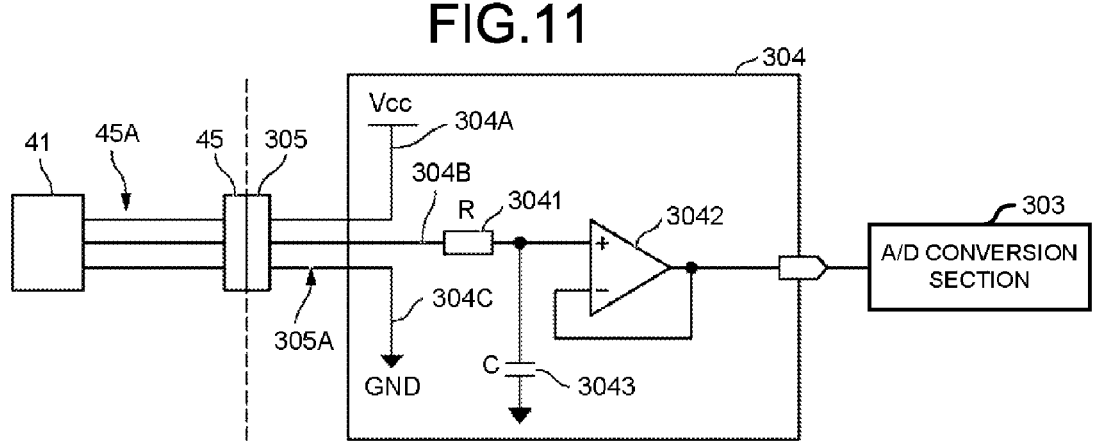
FIG.12
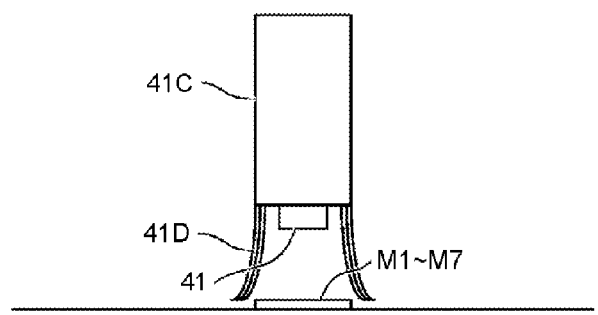

SHEET FEED APPARATUS AND SHEET HOUSING APPARATUS

FIELD

Embodiments described herein relate generally to a sheet feed apparatus and a sheet housing apparatus.

BACKGROUND

There is an image forming apparatus which conveys a sheet-like medium (hereinafter collectively referred to as "sheet") such as paper and meanwhile forms an image on the sheet. The image forming apparatus is provided with a sheet housing section for housing a plurality of sheets for each size. Sheets with a plurality of different sizes can be housed in the sheet housing section. The sheets of any size of the plurality of sizes can be housed in the sheet housing section.

The image forming apparatus takes a sheet of a requested size out from the sheet housing section. The image forming apparatus forms an i age on the taken out sheet.

For example, there is an image forming apparatus which detects the size of the sheet housed in the sheet housing section based on the detection result of a plurality of detection switches arranged inside the sheet housing section. A number (corresponding to the lengths of the sides of the sheets housed in the sheet housing section) of detection switches are arranged in the sheet housing section. Thus, there is a case in which a plurality of detection switches are arranged, and therefore, it is necessary to arrange a wiring harness bundling the electric wires from each detection switch.

BRIEF DESCRIPTION OF THE DRAWINGS

FIG. 10 is a diagram illustrating an example of a determination table;
FIG. 11 is a diagram illustrating an example of the circuit constitution of a detection circuit;
and
FIG. 12 is a cross-sectional view illustrating an example of the interlocking support section.

DETAILED DESCRIPTION

Figure 1:
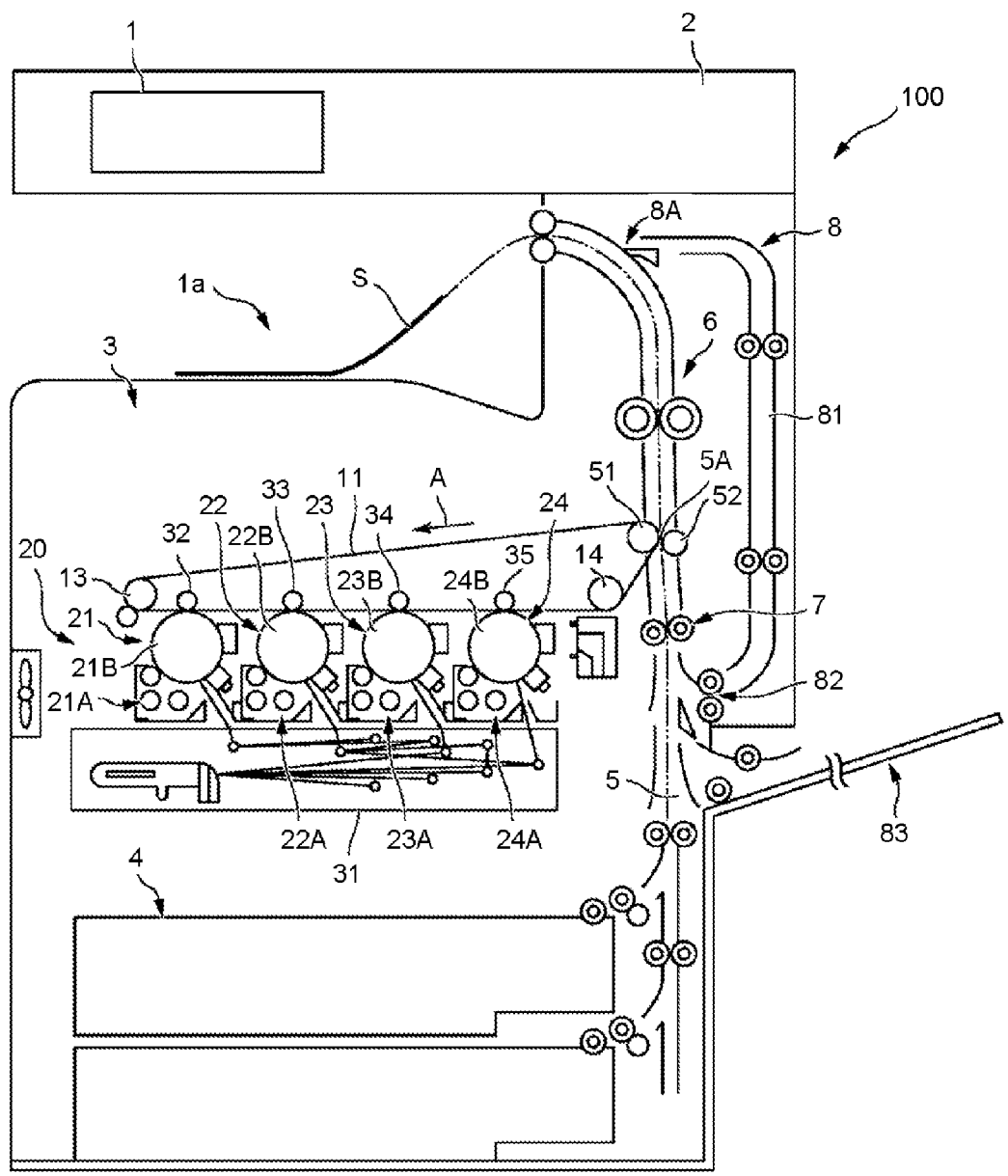
FIG. 1 is a schematic diagram illustrating an example of the whole constitution of an image forming apparatus according to one embodiment.

In accordance with one embodiment, a sheet feed apparatus comprises a sheet housing section, a guide, an optical sensor, markers and a determination section. The sheet housing section houses sheets. The guide is arranged at a position corresponding to the size of the sheet housed in the sheet housing section. The detection position of the optical sensor varies by interlocking with the guide. The markers, which have different image features corresponding to the sizes, are arranged at the detection position of the optical sensor pre-determined according to the size of the sheet. The determination section determines the size of the sheet housed in the sheet housing section based on a detection result of the optical sensor.

Hereinafter, an image forming apparatus 100 according to the embodiment is described with reference to the accompanying drawings. The same components in each figure are applied with the same reference numerals. The image forming apparatus 100 serves as a kind of sheet feed apparatus.

FIG. 1 is a schematic diagram illustrating an example of the whole constitution of the image forming apparatus 100 according to the embodiment.

As shown in FIG. 1, the image forming apparatus 100 comprises a scanner section 2, a printer section 3 and a sheet housing section 4.

The scanner section 2 reads image information of a copy object as brightness and darkness of light and outputs the read image information to the printer section 3.

The printer section 3 transfers an output image (hereinafter referred to as toner image) visualized with developing agent such as toner to a sheet S serving as an image transferred medium based on the image information output from the scanner section 2. The printer section 3 applies heat and pressure to the sheet S to which the toner image is transferred to fix the toner image on the sheet S.

The sheet housing section 4 respectively stores a plurality of sheets S of different given sizes for each size of the sheet S. The sheet housing section 4 supplies the sheet S one by one to the printer section 3 according to the timing when the toner image is formed in the printer section 3.

Between the sheet housing section 4 and the printer section 3 is arranged a conveyance path 5 which conveys the sheet S from the sheet housing section 4 to the printer section 3. A transfer position 5A exists on the conveyance path 5. The transfer position 5A is a position where the toner image formed in the printer section 3 is transferred to the sheet S. The sheet S is conveyed via the transfer position 5A towards a fixing device 6.

In the present embodiment, the upstream side of the flow of the sheet S conveyed on the conveyance path 5 is referred to as the upstream side of the conveyance path 5. The downstream side of the flow of the sheet S conveyed on the conveyance path 5 is referred to as the downstream side of the conveyance path 5.

An intermediate transfer belt 11 is arranged in the image forming apparatus 100. For example, the intermediate transfer belt 11 is arranged below the fixing device 6 in the vertical direction. For example, the intermediate transfer belt 11, which is an insulative film having a given thickness, is formed in a belt shape. The intermediate transfer belt 11 may also be a thin sheet-like metal the surface of which is protected with resin and the like.

A given tension is applied to the intermediate transfer belt 11 by a transfer driving roller 51, a first tension roller 13 and a second tension roller 14. When the transfer driving roller 51 is rotated, any position on the intermediate transfer belt 11 parallel to the axis of the transfer driving roller 51 is moved in a direction indicated by an arrow A. In other words, the belt surface of the intermediate transfer belt 11 is circulated in one direction at a speed equal to the speed of the movement of the outer peripheral surface of the transfer driving roller 51.

An image forming section 20 is arranged at a space where the belt surface of the intermediate transfer belt 11 is substantively moved in a plane in a state of being applied with the given tension.

The image forming section 20 includes image forming units 21, 22, 23 and 24 which are arranged between the first tension roller 13 and the second tension roller 14 at given intervals.

Each of the image forming units 21, 22, 23 and 24 includes a developing device 21A, 22A, 23A and 24A and a photoconductor 21B, 22B, 23B and 24B, respectively. Each developing device 21A, 22A, 23A and 24A stores toner of one color. For example, C (cyan), M (magenta), Y (yellow) and BK (black) toner is stored in the developing devices 21A, 22A, 23A and 24A, respectively.

An exposure device 31 is arranged at a position opposite to the photoconductors 21B, 22B, 23B and 24B. The exposure device 31 forms an electrostatic image corresponding to a color to be developed on the photoconductors 21B, 22B, 23B and 24B. The toner is selectively supplied by the developing devices 21A, 22A, 23A and 24A to the photoconductors 21B, 22B, 23B and 24B. In this way, the electrostatic images on the surfaces of the photoconductors 21B, 22B, 23B and 24B are developed with toner. As a result, toner images are formed on the surface of the photoconductors 21B, 22B, 23B and 24B.

Opposing rollers 32, 33, 34 and 35 are arranged at positions opposite to the photoconductors 21B, 22B, 23B and 24B across the intermediate transfer belt 11. Each of the opposing rollers 32, 33, 34 and 35 presses the intermediate transfer belt 11 against the photoconductors 21B, 22B, 23B and 24B. In this way, the toner images formed on the photoconductors 21B, 22B, 23B and 24B are transferred to the intermediate transfer belt 11. The toner images on the surfaces of the photoconductors 21B, 22B, 23B and 24B are sequentially transferred to the intermediate transfer belt 11 at given timing. The toner image of each color is formed on the intermediate transfer belt 11 through the transfer. The toner image of each color is overlapped at a given position of the surface of the intermediate transfer belt 11.

At the transfer position 5A arranged on the conveyance path 5 is arranged a transfer driven roller 52 which is contacted with the intermediate transfer belt 11 at a given pressure. The transfer driven roller 52 is pressed against the transfer driving roller 51 across the intermediate transfer belt 11.

Bias is applied between the transfer driving roller 51 and the transfer driven roller 52. In this way, the charged toner is moved towards the transfer driven roller 52 from the intermediate transfer belt 11. Thus, the toner image of each color overlapped on the surface of the intermediate transfer belt 11 is transferred to the sheet S at the transfer position 5A.

In addition, in a case where the transfer of the toner image to the sheet S is not required, the transfer driven roller 52 is moved to a retracting position by a roller releasing mechanism (not shown). The retracting position is set to a position where the transfer driven roller 52 is not contacted with the intermediate transfer belt 11.

A register roller pair 7 is arranged at a given position on the conveyance path 5 from the sheet housing section 4 to the transfer position 5A. The sheet S conveyed from the sheet housing section 4 passes through the register roller pair 7 and then enters the transfer position 5A. The register roller pair 7 adjusts the conveyance direction of the sheet S which is to enter the transfer position 5A.

The sheet S conveyed from the sheet housing section 4 towards the transfer position 5A along the conveyance path 5 is temporarily stopped when abutting against the register roller pair 7. In this way, the inclination of the sheet S in the conveyance direction is corrected.

The toner image is conveyed towards the transfer position 5A through the intermediate transfer belt 11. The register roller pair 7 is rotated again at the timing when the toner image reaches the transfer position 5A. The toner image is conveyed through the intermediate transfer belt 11 and reaches the transfer position 5A. The sheet S reaches the transfer position 5A at the timing when the toner image reaches the transfer position 5A. The sheet S is passed through the transfer position 5A to transfer the toner image to the sheet S.

The fixing device 6 applies heat and pressure to the toner image transferred to the sheet S. The toner image is fixed on the sheet S through the heat and pressure.

The sheet S on which the toner image is fixed by the fixing device 6 is guided to a sheet discharge section 1a along the conveyance path 5. The sheet discharge section 1a serves as one part of an exterior cover for covering the printer section 3. The sheet discharge section 1a is the space between the scanner section 2 and the printer section 3.

At the downstream side of the fixing device 6 on the conveyance path 5 is arranged a branch point 8A which guides the sheet S in a direction different form the sheet discharge section 1a. In a case of carrying out printing on both sides of the sheet S, the sheet S is temporarily discharged towards the sheet discharge section 1a. Then the sheet S is drawn into the printer section 3 again. The sheet S is guided to a reversal unit 8 through the branch point 8A.

The reversal unit 8 conveys the sheet S along a conveyance path 81 in the reversal unit 8.

A reversal unit register roller pair 82 is arranged in the reversal unit 8.

Similar to the register roller pair 7, the reversal unit register roller pair 82 temporarily stops the sheet conveyed on the conveyance path 81. In this way, the inclination of the sheet S is corrected. Further, the reversal unit register roller pair 82 restarts the conveyance of the sheet S at the timing when the toner image reaches the transfer position 5A. The sheet S conveyed from the reversal unit register roller pair 82 is merged with the conveyance path 5.

On the conveyance path 5, there is a position where the sheet S discharged from the reversal unit register roller pair 82 is merged with the conveyance path 5. The sheet S can be inserted to the conveyance path 5 from a manual feeding tray 83 at the upstream side of the position where the sheet S is merged with the conveyance path 5.

Figure 2:
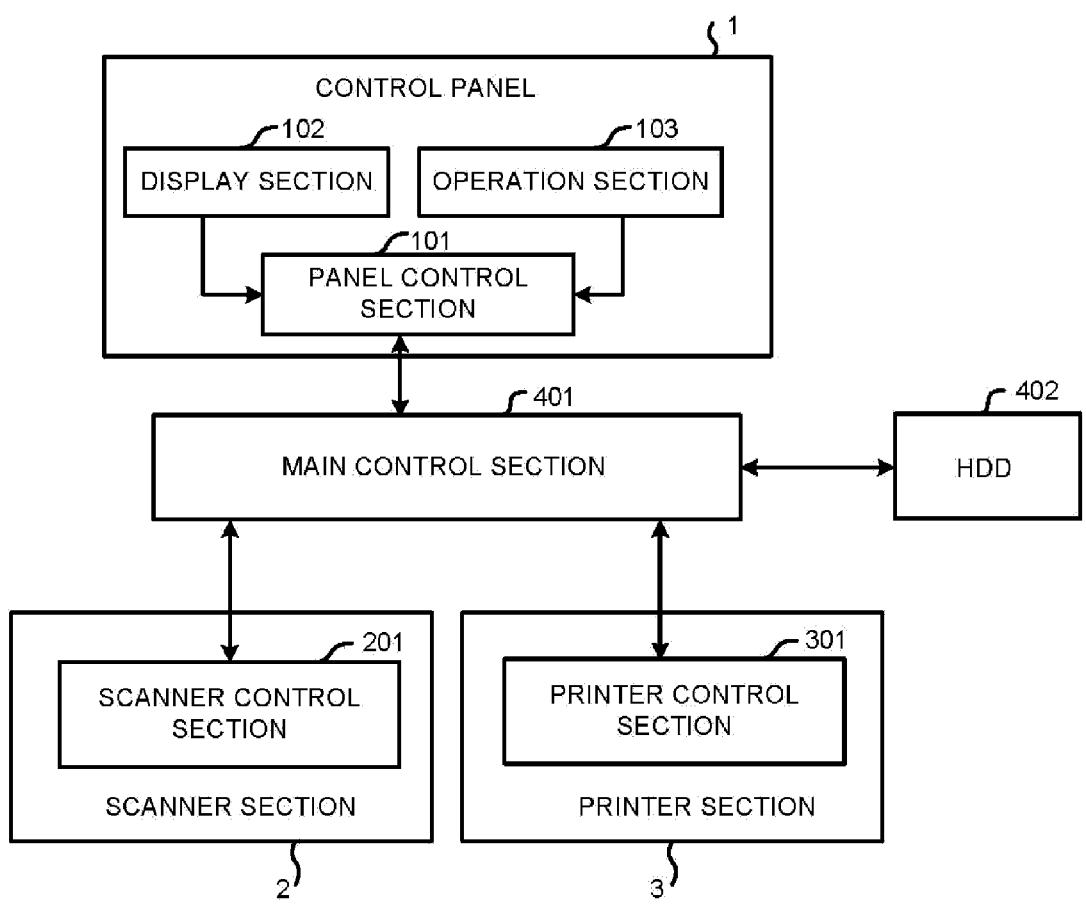
FIG. 2 is a block diagram illustrating an example of the constitution of the image forming apparatus.

Next, the constitution of the image forming apparatus 100 is described with reference to FIG. 2. FIG. 2 is a block diagram illustrating an example of the constitution of the image forming apparatus 100.

A control panel 1 and the scanner section 2 and the printer section 3 described above are connected with a main control section 401. The main control section 401 controls the whole operations of the image forming apparatus 100. The main control section 401 is connected with an HDD (Hard Disk Drive) 402. The main control section 401 includes a CPU (Central Processing Unit), an ROM (read only memory) and an RAM (Random Access Memory).

The HDD 402, which is a memory such as a semiconductor storage device, a magnetic storage device and the like, stores programs and the like for operating the main control section 401.

The control panel 1 includes a panel control section 101, a display section 102 and an operation section 103. The panel control section 101, which consists of a CPU, an ROM and an RAM, controls the control panel 1.

The display section 102 outputs a screen corresponding to the operation content or an image corresponding to an instruction from the main control section 401.

The operation section 103, which includes various keys, receives an operation from a user, and outputs a signal indicating the operation content to the panel control section 101.

The display section 102 and the operation section 103 may be integrally arranged as a touch panel type display.

In the present embodiment, the main control section 401 displays various settings such as the number of printings, the size and the category of the sheet S, and the like on the display section 102. The operation section 103 receives a designation and a change of the setting. For example, information relating to the setting is displayed on the display section 102. For example, the information indicating the category of the sheet S is designated through the operation section 103. The operation section 103 outputs the information indicating the designated category of the sheet S to a printer control section 301. The printer control section 301 writes the designated category of the sheet S in the RAM arranged inside.

The scanner section 2 is provided with a scanner control section 201. The scanner control section 201, which includes a CPU, an ROM and an RAM, controls the scanner section 2 to read image information.

The printer section 3 is provided with a printer control section 301. The printer control section 301, which includes a CPU, an ROM and an RAM, controls the printer section 3 to print an image on the sheet S.

Figure 3:
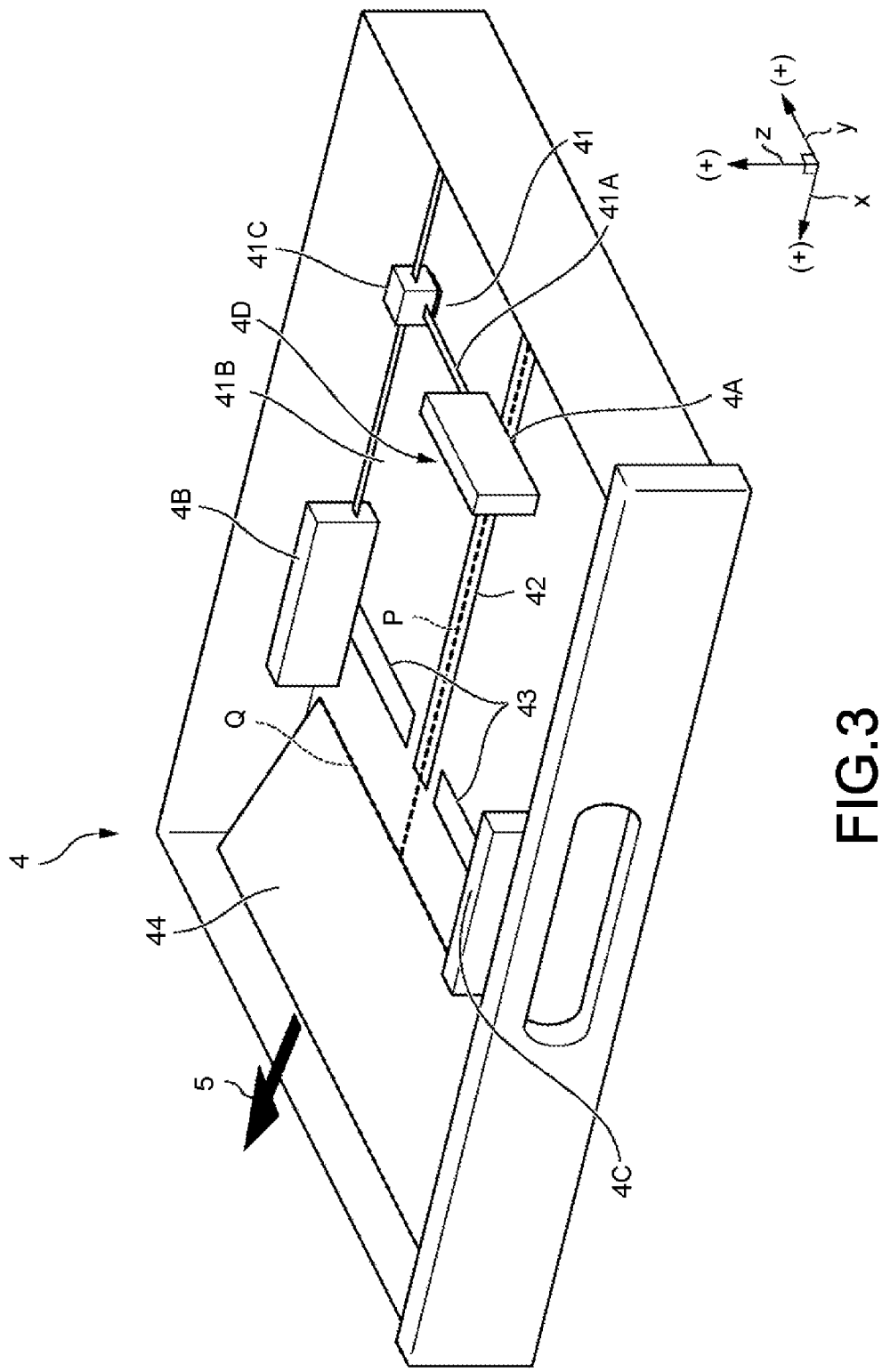
FIG. 3 is a perspective view illustrating an example of the constitution of a sheet housing section.

Next, the constitution of the sheet housing section 4 is described in detail with reference to FIG. 3. FIG. 3 is a perspective view illustrating an example of the constitution of the sheet housing section 4. In addition, the image forming apparatus 100 is provided with a plurality of sheet housing sections 4. Herein, one sheet housing section 4 is described.

The sheet housing section 4 houses more than one sheet S in the same size. For example, the largest sized sheet the sheet housing section 4 can house is the A3-sized sheet.

In FIG. 3, the x axis direction corresponds to the long side direction of the largest-sized sheet S housed in the sheet housing section 4. The y axis direction corresponds to the short side direction of the largest-sized sheet S housed in the sheet housing section 4. The z axis is orthogonal to the x axis and the y axis. The sheet S housed in the sheet housing section 4 is taken out towards the plus direction of the x axis. The sheet S taken out from the sheet housing section 4 is conveyed along the conveyance path 5.

The sheet housing section 4 includes a sheet guide 4A, a sheet guide 4B, a sheet guide 4C, an optical sensor 41, an interlocking support section 41A and an interlocking support section 41B.

The sheet guides 4A, 4B and 4C stand vertically on a bottom surface 4D of the sheet housing section 4. The sheet guides 4A, 4B and 4C can be moved parallel to the bottom surface 4D.

The sheet guide 4A can be moved along the guide rail 42 in the x axis direction. A reference line P parallel to the x axis and a top reference line Q parallel to the y axis are set on the bottom surface 4D of the sheet housing section 4. The sheet guide 4A can be moved along the reference line P. A slope 44 is arranged at the downstream side of the top reference line Q in the plus direction of the x axis. The slope 44 has an inclined surface rising from the bottom surface 4D of the sheet housing section 4 at a given angle. The sheet S taken out from the sheet housing section 4 is taken out along the inclined surface of the slope 44. The sheet S passing through the slope 44 is guided to the conveyance path 5.

The sheet guides 4B and 4C can be moved along guide rails 43 in the y axis direction. The sheet guides 4B and 4C are interlocked to each other. Either of the sheet guides 4B and 4C is moved, the other one is interlocked to move. For example, either of the sheet guides 4B and 4C is interlocked to move in a direction opposite to the direction, in which the other one is moved, for the same distance. The sheet guides 4B and 4C are arranged at positions which are at the same distance away from the reference line P.

The optical sensor 41 optically detects the feature of the image. For example, the optical sensor 41 is a density sensor or an image sensor. The density sensor detects the difference in the image density. The density sensor outputs different detection signals according to the image density. The image sensor detects the difference in the color, pattern and shape of the image. The image sensor outputs a detection signal indicating the feature of the detected image. The image sensor may be a barcode reader for reading information contained in a barcode. In this case, the barcode contains the information indicating the size of the sheet S.

The optical sensor 41 is connected with the interlocking support sections 41A and 41B through the interlocking support section 41C. The optical sensor 41 is arranged at one part of the interlocking support section 41O. Specifically, the optical sensor 41 is arranged at the surface of the interlocking support section 41C opposite to the bottom surface 4D of the sheet housing section 4. The detection surface of the optical sensor 41 arranged on the interlocking support section 41C faces the bottom surface 4D of the sheet housing section 4.

The interlocking support section 41C is connected with the sheet guide 4A through the interlocking support section 41A. The interlocking support section 41O is connected with the sheet guide 4B through the interlocking support section 41B.

The interlocking support section 41C is connected with the interlocking support section 41A in a manner of being capable of moving in the y axis direction. The interlocking support section 41C is connected with the interlocking support section 41B in a manner of being capable of moving in the x axis direction.

The optical sensor 41 moves along the interlocking support section 41B in the x axis direction in a case in which the sheet guide 4A is moved in the x axis direction. The optical sensor 41 moves along the interlocking support section 41A in the y axis direction in a case in which the sheet guides 4B and 4C are moved in the y axis direction.

When the sheet guides 4A, 4B and 4C are moved, the optical sensor 41 is interlocked to move as well. When the optical sensor 41 is moved, the detection position of the optical sensor 41 is also moved. That is, the detection position of the optical sensor 41 is interlocked to move with the sheet guides 4A, 4B and 4C.

Figure 4:
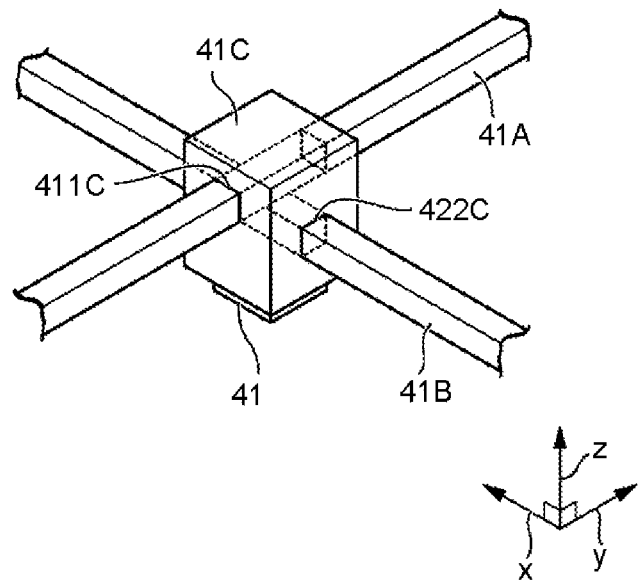
FIG. 4 is a perspective view illustrating an example of an interlocking support section.

Next, an example of the interlocking support section 41C is described with reference to FIG. 4. FIG. 4 is a perspective view illustrating an example of the interlocking support section 41C.

As shown in FIG. 4, the interlocking support section 41C includes a penetrating section 411C and a penetrating section 422C. The penetrating sections 411C and 422C are arranged at positions which are different from each other in the z axis direction. The interlocking support section 41A penetrates the penetrating section 411C. The interlocking support section 41B penetrates the penetrating section 422C. Through such a constitution, the interlocking support section 410 can be moved along the interlocking support sections 41A and 41B in the x and y axis directions.

Figure 5:
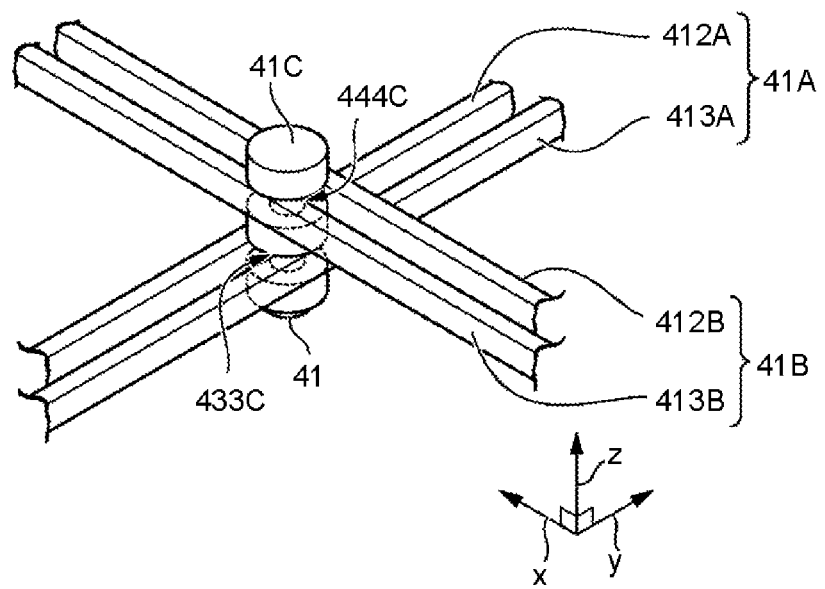
FIG. 5 is a perspective view illustrating another example of the interlocking support section.

Next, another example of the interlocking support section 41C is described with reference to FIG. 5. FIG. 5 is a perspective view illustrating another example the interlocking support section 41C.

The example shown in FIG. 5 is different from the example shown in FIG. 4 in a point that each of the interlocking support sections 41A and 41B is constituted by two bar members.

As shown in FIG. 5, the interlocking support section 41C includes a groove section 433C and a groove section 444C. The groove sections 433C and 444C are arranged at positions which are different from each other in the z axis direction. The interlocking support section 41A includes two bar members 412A and 413A. The interlocking support section 41B includes two bar members 412B and 413B.

The bar members 412A and 413A are inserted into the groove section 433C. The bar members 412A and 413A nip, in a direction parallel to the bottom surface 4D, the interlocking support section 41C in the groove section 433C. The groove section 433C slides in a state in which the interlocking support section 41C is nipped by the bar members 412A and 413A The bar members 412B and 413B are inserted into the groove section 444C. The bar members 412B and 413B nip, in a direction parallel to the bottom surface 4D, the interlocking support section 41C in the groove section 444C. The groove section 444C slides in a state in which the interlocking support section 41C is nipped by the bar members 412B and 413B.

Through such a constitution, the interlocking support section 41C can move along the interlocking support sections 41A and 41B in the x and y axis directions.

Figure 6:
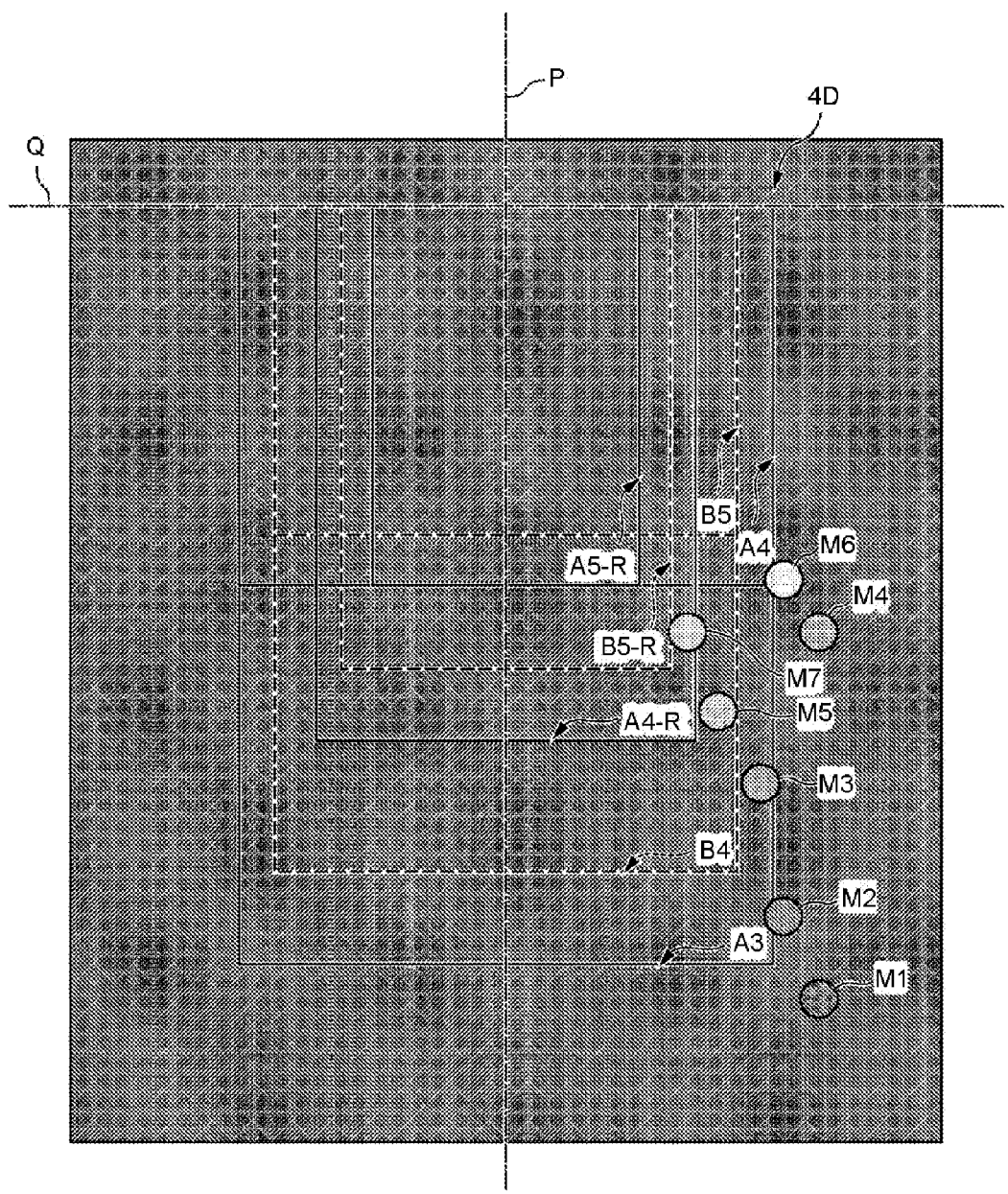
FIG. 6 is a diagram illustrating an example of markers arranged at a bottom surface of the sheet housing section.

Next, an example of markers arranged at the bottom surface 4D of the sheet housing section 4 is described with reference to FIG. 6. FIG. 6 is a diagram illustrating an example of the markers arranged at the bottom surface 4D of the sheet housing section 4.

As shown in FIG. 6, a plurality of markers M1-M7 is arranged at the bottom surface 4D of the sheet housing section 4. The markers M1-M7 are arranged at pre-determined detection positions corresponding to the size of the sheet S.

The detection position refers to a position at which the optical sensor 41 can detect the feature of the image at any position of the markers M1-M7 in a state in which the sheet guides 4A, 4B and 4C are positioned at sheet regulating positions.

The sheet regulating position refers to a position at which the sheet guides 4A, 4B and 4C regulate the deviation of the sheets S in a state in which the sheets S are housed at sheet reference positions determined according to the size. For example, the sheet guides 4A, 4B and 4C positioned at the sheet regulating positions abuts against the sheet S housed in the sheet housing section 4. The abutting state includes a state in which the sheet guides 4A, 4B and 4C contacts with the edges of the sheet S.

The sheet reference position refers to a position at which the sheets S are properly housed in the sheet housing section 4. When the sheet S is housed at the sheet reference position, the center of the sheet S overlaps with the reference line P, and the top of the sheet S overlaps with the top reference line Q. The overlapping state includes a state in which the center of the sheet S is slightly deviated from the reference line P. In addition, the top of the sheet S refers to the top of the sheet in the direction in which the sheet S is taken out from the sheet housing section 4.

The marker M1 is positioned at a detection position S1 of the optical sensor 41. In a case in which the A3-sized sheet S is housed at the sheet reference position, the detection position S1 faces the optical sensor 41. In this state, the sheet guides 4A, 4B and 4C are positioned at the sheet regulating positions.

The marker M2 is positioned at a detection position S2 of the optical sensor 41. In a case in which a B4-sized sheet S is housed at the sheet reference position, the detection position S2 faces the optical sensor 41. In this state, the sheet guides 4A, 4B and 4C are positioned at the sheet regulating positions.

The marker M3 is positioned at a detection position S3 of the optical sensor 41. In a case in which an A4-sized sheet S is housed at the sheet reference position in a landscape orientation, the detection position S3 faces the optical sensor 41. In this state, the sheet guides 4A, 4B and 4C are positioned at the sheet regulating positions.

The landscape orientation refers to a method of placing the sheet S in such a manner that the long side of the sheet S corresponds to the x axis direction and the short side corresponds to the y axis direction.

The marker M4 is positioned at a detection position S4 of the optical sensor 41. In a case in which an A4-sized sheet S is housed at the sheet reference position, the detection position S4 faces the optical sensor 41. In this state, the sheet guides 4A, 4B and 4C are positioned at the sheet regulating positions.

The marker M5 is positioned at a detection position S5 of the optical sensor 41. In a case in which a B5-sized sheet S is housed at the sheet reference position in a landscape orientation, the detection position S5 faces the optical sensor 41. In this state, the sheet guides 4A, 4B and 4C are positioned at the sheet regulating positions.

The marker M6 is positioned at a detection position S6 of the optical sensor 41. In a case in which a B4-sized sheet S is housed at the sheet reference position, the detection position S6 faces the optical sensor 41. In this state, the sheet guides 4A, 4B and 4C are positioned at the sheet regulating positions.

The marker M7 is positioned at a detection position S7 of the optical sensor 41. In a case in which an A5-sized sheet S is housed at the sheet reference position in a landscape orientation, the detection position S7 faces the optical sensor 41. In this state, the sheet guides 4A, 4B and 4C are positioned at the sheet regulating positions.

In the embodiment, the markers M1-M7 are images having different image densities. Further, the markers M1-M7 are images having image densities different from the image density of the bottom surface 4D of the sheet housing section 4. For example, the markers M1-M7 and the bottom surface 4D of the sheet housing section 4 have image densities higher than white. For example, the density of the marker Ml is the highest, and the density of the marker M7 is the lowest. The densities of the marker M2-M6 gradate imperceptibly to be lower and lower from the marker M1 to the marker M7. The density of the bottom surface 4D of the sheet housing section 4 is higher than the densities of the markers M1-M7.

Figure 7:
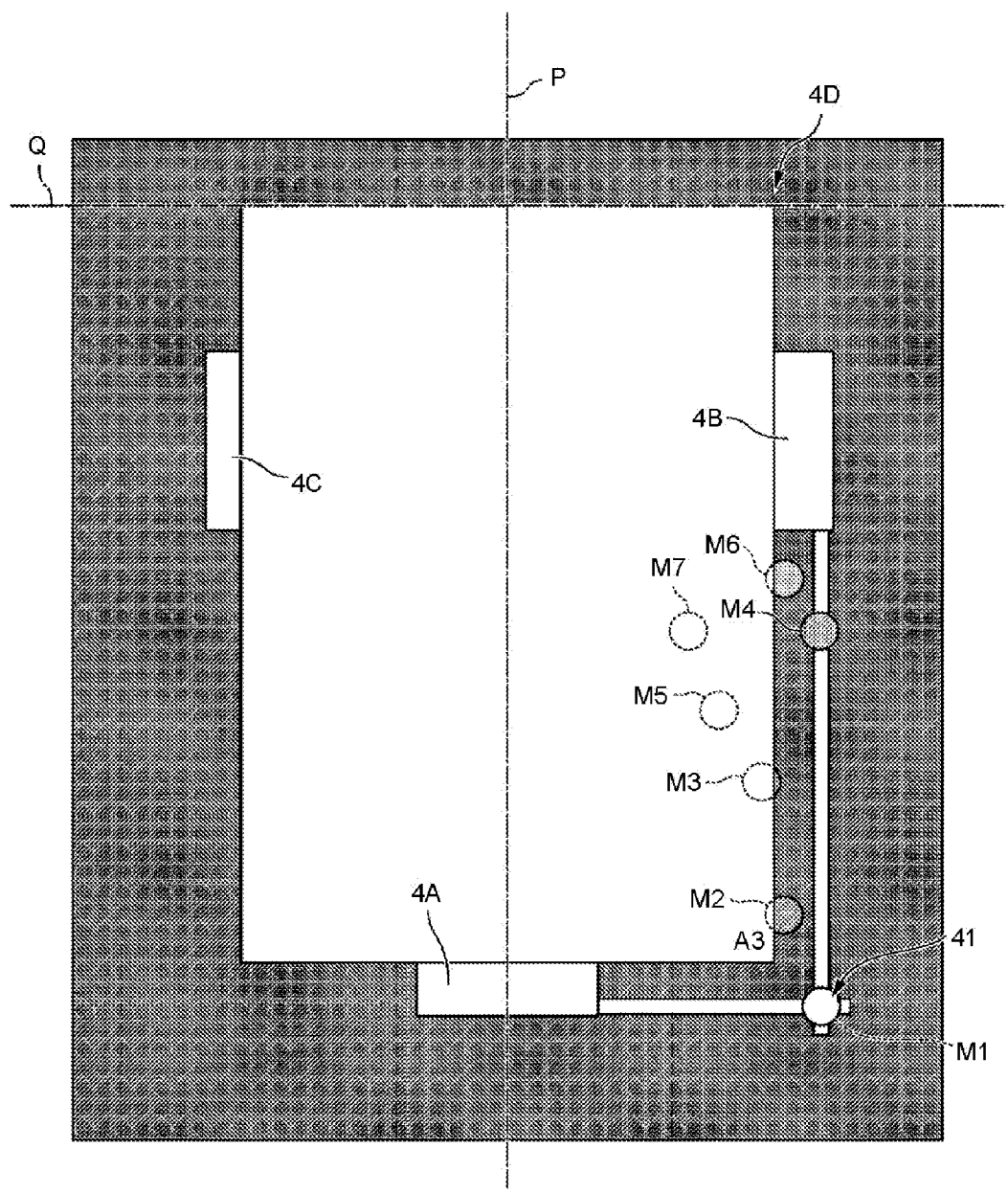
FIG. 7 is a diagram illustrating a state in which an optical sensor is positioned at an A3-sized sheet detection position.

Next, a state in which the optical sensor 41 is positioned at the detection position S1 is described with reference to FIG. 7. FIG. 7 is a diagram illustrating a state in which the optical sensor 41 is positioned at the detection position S1.

The A3-sized sheet S is arranged at the sheet reference position. The sheet guides 4A, 4B and 4C are positioned at the sheet regulating positions. In this case, the optical sensor 41 faces the detection position S1. That is, the optical sensor 41 faces the marker M1. It is assumed that the A3-sized sheet S is housed properly and the sheet guides 4A, 4B and 4C are positioned at proper positions by a user. In this case, the optical sensor 41 faces the marker M1. In this way, the optical sensor 41 can detect the feature of the image of the marker M1.

Figure 8:
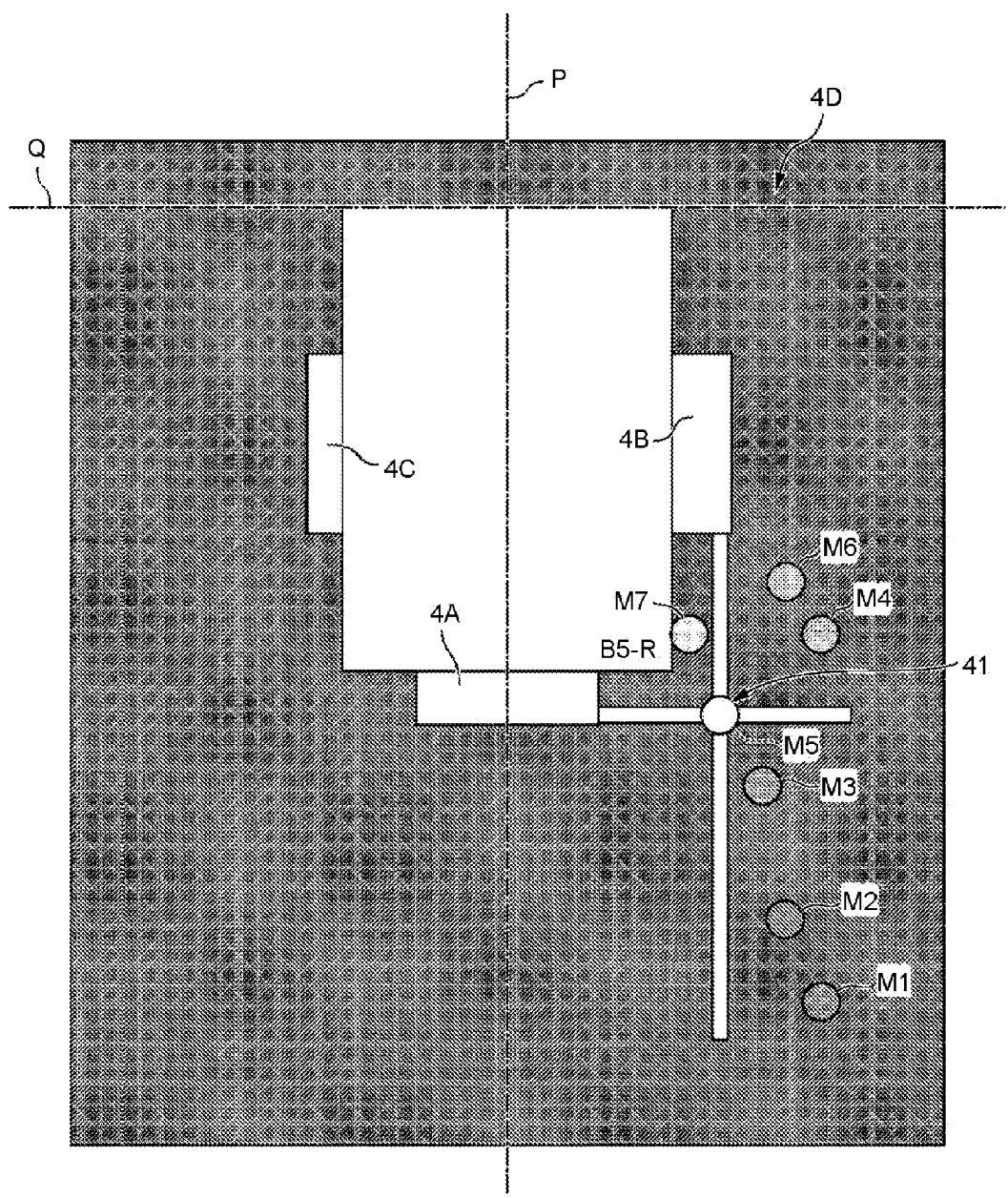
FIG. 8 is a diagram illustrating a state in which the optical sensor is positioned at a B5-sized sheet detection position.

Next, a state in which the optical sensor 41 is positioned at the detection position S5 is described with reference to FIG. 8. FIG. 8 is a diagram illustrating a state in which the optical sensor 41 is positioned at the detection position S5.

The B5-sized sheet S is arranged at the sheet reference position in the landscape orientation. The sheet guides 4A, 4B and 4C are positioned at the sheet regulating positions. In this case, the optical sensor 41 is positioned at a position facing the detection position S5. That is, the optical sensor 41 faces the marker M5. It is assumed that the B5-sized sheet S is housed properly in the landscape orientation and the sheet guides 4A, 4B and 4C are positioned at proper positions by a user. In this case, the optical sensor 41 faces the marker M5. In this way, the optical sensor 41 can detect the feature of the image of the marker M5.

Figure 9:
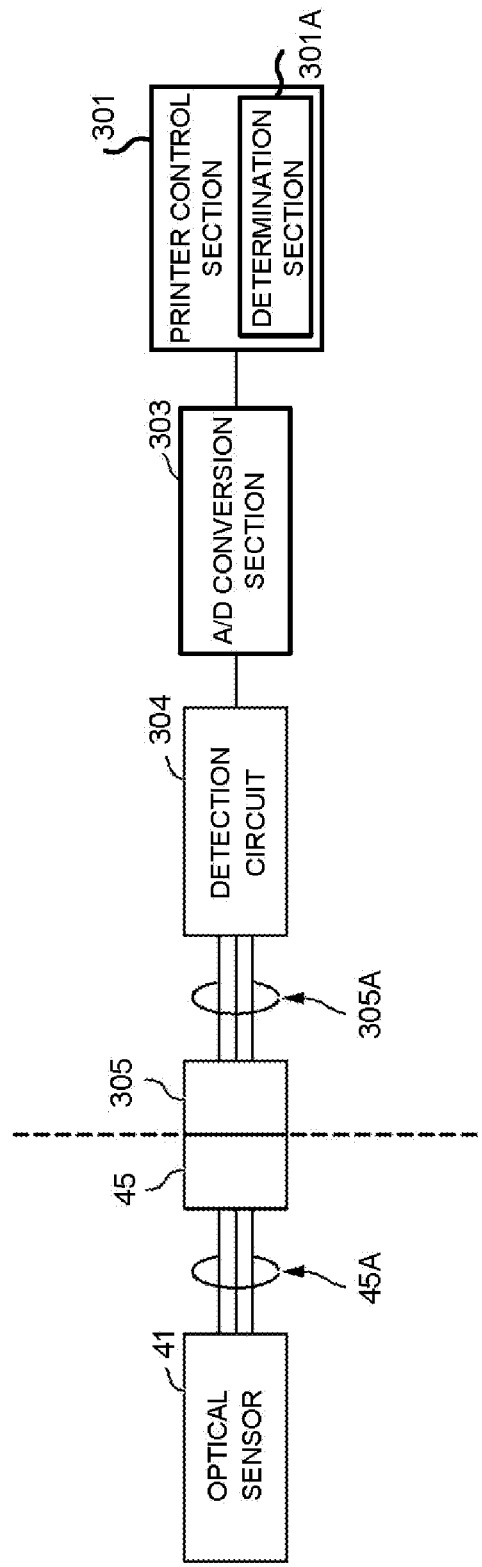
FIG. 9 is a block diagram illustrating an example of the components for executing the processing based on a detection result of the optical sensor.

Next, the components for executing the processing based on the detection result of the optical sensor 41 are described with reference to FIG. 9. FIG. 9 is a block diagram illustrating an example of the components for executing the processing based on the detection result of the optical sensor 41.

As shown in FIG. 9, the optical sensor 41 is connected with a connector 45 through a cable 45A. For example, the cable 45A includes three electric wires. The cable 45A outputs a signal (hereinafter referred to as a "detection signal") indicating the detection result of the optical sensor 41 from one electric wire within the three electric wires. For example, the connector 45 is arranged at the lateral side of the sheet housing section 4.

The printer control section 301 arranged at the lateral side of the image forming apparatus 100 is connected with an A/D conversion section 303. The A/D conversion section 303 is connected with a detection circuit 304 which is connected with a connector 305 through a cable 305A. For example, the cable 305A includes three electric wires.

In a case in which the connector 45 is connected with the connector 305, the three electric wires of the cable 305A are connected with the three electric wires of the cable 45A, respectively. In a state in which the sheet housing section 4 is arranged properly at a given space of the image forming apparatus 100, the connector 45 and the connector 305 are connected with each other.

The detection circuit 304 outputs power of a voltage corresponding to the detection signal input from the optical sensor 41. The voltage of the power output by the detection circuit 304 is referred to as a detection voltage V in the following description.

The A/D conversion section 303 converts the power input from the detection circuit 304 into a digital signal. The A/D conversion section 303 outputs the converted digital signal to the printer control section 301.

The printer control section 301 includes a determination section 301A as a function section that functions through the execution of a program by the CPU. Part of or all the determination section 301A may be a hardware function section such as an LSI (Large Scale Integration), an ASIC (Application Specific Integrated Circuit) and the like.

The determination section 301A determines the size of the sheet S housed in the sheet housing section 4 based on the detection result of the optical sensor 41. In the embodiment, the determination section 301A determines the size of the sheet S housed in the sheet housing section 4 based on the detection voltage V of the power output from the detection circuit 304.

The determination section 301A determines the density corresponding to the detection voltage V of the power output from the detection circuit 304 by reference to a determination table 302T stored in the ROM or the RAM of the printer control section.

An example of the determination table 302T is shown in FIG. 10. The determination table 302T is a table in which the determination result, the detection voltage V and the density are associated with each other.

In the determination table 302T, detection voltages V0-Vcc are in a relation indicated by a formula (1) as follows.

$$V0<V1<V2<V3<V4<V5<V6<V7<Vcc \qquad \text{Formula (1):}$$

In addition, Vcc is a voltage value of the power source voltage supplied to the detection circuit 304.

In the table 1, the densities D3-D10 are in a relation indicated by a formula (2) as follows.

$$D10>D9>D8>D7>D6>D5>D4>D3 \qquad \text{Formula (2):}$$

That is, when the detection voltage V is V0, the density D10 is the highest, and when the detection voltage V is Vcc, the density D3 is the lowest. The densities D4-D9 gradate imperceptibly to be lower and lower from the detection voltage V0 to the detection voltage Vcc.

In the embodiment, the density of the bottom surface 4D of the sheet housing section 4 is D10. The densities of the markers M1-M7 are D9-D3.

When the detection voltage V is Vo, the determination section 301A determines that it is a size error. The size error means that the sheet S of a specified size is not housed in the sheet housing section 4. The size error further means that the sheet guides 4A, 4B and 4C are not positioned at the positions (that is, the sheet regulating positions) corresponding to the size of the sheet S.

In a case in which the detection voltage V is V1, the determination section 301A determines that the size of the sheet S is A3.

In a case in which the detection voltage V is V2, the determination section 301A determines that the size of the sheet S is B4.

In a case in which the detection voltage V is V3, the determination section 301A determines that the size of the sheet S is A4-R.

In a case in which the detection voltage V is V4, the determination section 301A determines that the size of the sheet S is A4.

In a case in which the detection voltage V is V5, the determination section 301A determines that the size of the sheet S is B5-R.

In a case in which the detection voltage V is V6, the determination section 301A determines that the size of the sheet S is B5.

In a case in which the detection voltage V is V7, the determination section 301A determines that the size of the sheet S is A5-R.

In addition, the mark "–R" refers to a sheet S housed in the landscape orientation. In a case in which the size does not include the mark "–R", it means that the direction in which the sheet S is housed is not the landscape orientation.

Next, the circuit constitution of the detection circuit 304 is described with reference to FIG. 11. FIG. 11 is a diagram illustrating an example of the circuit constitution of the detection circuit 304.

As shown in FIG. 11, the detection circuit 304 includes a resistance 3041, an operational amplifier 3042 and a capacitor 3043. The three electric wires includes in the cable 305A are connected with the power source (Vcc), the ground (GND) and the resistance 3041, respectively. The resistance 3041 is connected with the A/D conversion section 303 through the operational amplifier 3042. The capacitor 3043 is connected with the part between the electric wire and the ground. The electric wire connected with the capacitor 3043 is the electric wire for connecting the resistance 3041 with the operational amplifier 3042.

In a case in which the detection result is input by the optical sensor 41, the detection circuit 304 outputs the detection voltage V corresponding to the detection result of the optical sensor 41. On the other hand, in a case in which the connector 45 is not connected with the connector 305, the detection result of the optical sensor 41 is not input to the detection circuit 304. In this case, the detection circuit 304 outputs the power of the power source voltage Vcc.

Next, an example of the interlocking support section 41C is described with reference to FIG. 12. FIG. 12 is a cross-sectional view illustrating an example of the interlocking support section 41C. The cross-sectional view is obtained by cutting the interlocking support section 41C in the x axis direction.

The interlocking support section 41C includes a cleaner 41D at the surface opposite to the bottom surface 4D of the sheet housing section 4. For example, the cleaner 41D is a brush for cleaning the surface of the markers M1-M7. For example, the brush tip of the cleaner 41D contacts with the markers M1-M7. The interlocking support section 41C is interlocked to operate with the guides 4A, 4B and 4C, in this way, the cleaner 41D cleans the markers M1-M7. In this way, the markers M1-M7 are cleaned.

In addition, it is exemplified in FIG. 12 that the cleaner 41D is arranged at the lateral sides of the interlocking support section 41C corresponding to the y axis direction; however, it is not limited to this. For example, the cleaner 41D may be arranged at the lateral sides of the interlocking support section 41C corresponding to the x axis direction.

The cleaner 41D is not limited to a brush. For example, the cleaner 41D may be a sponge or a rubber spatula.

The cleaner 41D, which is not limited to be arranged on the interlocking support section 41C, may also be arranged on the interlocking support sections 41A and 41B. In this case, the cleaner 41D is preferred to be arranged at the part of the interlocking support sections 41A and 41B facing the bottom surface 4D of the sheet housing section 4.

As stated above, the image forming apparatus 100 according to the embodiment is provided with the optical sensor 41 interlocked with the guides and the markers M1-M7 arranged on the bottom surface 4D of the sheet housing section 4. The determination section 301A of the image forming apparatus 100 determines the size of the sheet S housed in the sheet housing section 4 based on the detection result of the optical sensor 41. Through such a constitution, the optical sensor 41 is moved to the detection position corresponding to the size of the sheet S. Thus, the optical sensor 41 can detect the size of the sheet S housed in the sheet housing section 4. In this way, the image forming apparatus 100 can reduce the number of the optical sensors 41, which can reduce the cost.

The image forming apparatus 100 according to the embodiment is provided with one optical sensor 41. The markers M1-M7 are arranged for each size of the sheets S. Through such a constitution, the number of the optical sensors 41 can be minimized. Thus, the number of components can be reduced, which can reduce the cost. Further, the number of the markers is minimized. In this way, the positioning of the markers M1-M7 and the optical sensor 41 can be carried out easily.

The image forming apparatus 100 according to the embodiment detects an error in a case in which the detection result of the optical sensor 41 indicates the image feature of the bottom surface 4D of the sheet housing section 4. The error means that the sheet S of a specified size is not housed in the sheet housing section 4. The size error further means that the sheet guides 4A, 4B and 4C are not positioned at the positions corresponding to the size of the sheet S. Through such a constitution, the image forming apparatus 100 can not only determine the size of the sheet S, but also detect, with the optical sensor 41, an operation error of the user in the housing of the sheet S. In this way, the problem such as paper jam in the printing process can be prevented.

The image forming apparatus 100 according to the embodiment is further provided with the detection circuit. The detection circuit 304 outputs the detection voltage corresponding to the image density based on the detection result of the optical sensor 41. The determination section 301A determines the size of the sheet S housed in the sheet housing section 4 based on the detection voltage output from the detection circuit 304. Through such a constitution, an inexpensive density sensor can be used as the optical sensor 41 to determine the size of the sheet S easily.

The image forming apparatus 100 according to the embodiment determines that the sheet housing section 4 is not arranged in the image forming apparatus 100 based on the output of the detection circuit. Through such a constitution, the image forming apparatus 100 can not only determine the size of the sheet S, but also detect, with the optical sensor 41, the error of the sheet housing section 4.

The image forming apparatus 100 according to the embodiment positions the optical sensor 41 at a position facing the markers M1-M7 in a given state. The given state refers to a state in which the sheet S is housed at the sheet reference position and the guides 4A, 4B and 4C are positioned at the sheet regulating positions. Through such a constitution, it is possible to easily determine whether or not the sheet S of a given size is housed properly.

The image forming apparatus 100 according to the embodiment is further provided with the cleaner 41D which can clean the markers M1-M7 and the like by interlocking with the guides 4A, 4B and 4C. Through such a constitution, the cleaner 41D can clean the markers M1-M7 and the like every time the user moves the guides 4A, 4B and 4C. Thus, the foreign matter attached to the markers M1-M7 can be removed, which can prevent error detection of the optical sensor 41.

The optical sensor 41 of the image forming apparatus 100 according to the embodiment is arranged at the interlocking support section 41C. The interlocking support section 41C is interlocked with the guides 4A and 4B. Through such a constitution, when the guide 4A is moved in the x axis direction, the optical sensor 41 is also moved in the x axis direction. When the guide 4B is moved in the y axis direction, the optical sensor 41 is also moved in the y axis direction. In this way, the optical sensor 41 can be moved by moving the guides 4A and 4B. Thus, the work only for moving the optical sensor 41 is not needed, which can improve the operability of the user.

The optical sensor 41 of the image forming apparatus 100 according to the embodiment is arranged at a position where the interlocking support section 41A intersects with the interlocking support section 41B. Through such a constitution, the position of the optical sensor 41 is uniquely determined according to the positions of the guides 4A and 4B. Thus, the positioning of the optical sensor 41 corresponding to the size of the sheet S can be carried out easily.

In addition, it is exemplified that the image forming apparatus 100 fixes a toner image, however, the image forming apparatus 100 may be an inkjet type image forming apparatus.

The sheet housing section 4 is not limited to be applied to the image forming apparatus 100, and it may also be applied to other sheet feed apparatus. The "other sheet feed apparatus" includes, for example, a decoloring apparatus and the like. In this case, the detection circuit 304, and the determination section 301A are arranged inside the decoloring apparatus and the like.

It is exemplified that the marker Ml has the highest density and the marker M7 has the lowest density within the markers M1-M7, however, the present invention is not limited to this. For example, the marker M1 may have the lowest density and the marker M7 may have the highest density. Alternatively, the markers M1-M7 may not gradate in density as long as the image features thereof are different from each other.

It is exemplified that the bottom surface 4D of the sheet housing section 4 has a density higher than the densities of the markers M1-M7, however, the present invention is not limited to this. For example, the density of the bottom surface 4D of the sheet housing section 4 may be lower than the densities of the markers M1-M7. Alternatively, the density of the bottom surface 4D of the sheet housing section 4 may be a density among the densities of the markers M1-M7 as long as the image feature of the bottom surface 4D of the sheet housing section 4 is different from those of the markers M1-M7.

The markers Ml-M7 may be seals attached to the bottom surface 4D of the sheet housing section 4. Alternatively, the markers M1-M7 may be printed on the sheets arranged on the bottom surface 4D of the sheet housing section 4. The image of the density of the bottom surface 4D of the sheet housing section 4 is printed on the back side of the sheet.

The size of the sheet S is exemplified as the standard sizes of A and B system, however, it is not limited to this. For example, other standard sizes may also be used.

Further, the size and the position of each roller can be set freely.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A sheet feed apparatus comprising:
   a sheet housing section configured to house sheets;
   a guide configured to be arranged at a position corresponding to the size of the sheet housed in the sheet housing section, the guide comprising a first guide which moves inside the sheet housing section in a first direction, and a second guide which moves inside the sheet housing section in a second direction orthogonal to the first direction;
   an optical sensor having a varying optical sensor detection position that varies according to the size of the sheet while interlocking with the guide, the optical sensor being arranged on an interlocking support section which is interlocked with the first guide and the second guide;
   a plurality of markers that are spatially separated from each other, the plurality of markers having different image features corresponding to different sheet sizes, each of the plurality of markers being positioned at a respective fixed position associated with a respective sheet size, the respective fixed position being identical to the varying optical sensor detection position, the plurality of markers being arranged at the bottom surface of the sheet housing section; and
   a determination section configured to determine the size of the sheet housed in the sheet housing section based on a detection result of the optical sensor.

2. The sheet feed apparatus according to claim 1, wherein the sheet housing section includes a bottom surface which has an image feature different from the image features of the markers,
   the determination section determines that the sheet of a specified size is not housed in the sheet housing section or that the guide is not positioned at a position corresponding to the size of the sheet, in a case in which the detection result of the optical sensor indicates the image feature of the bottom surface of the sheet housing section.

3. The sheet feed apparatus according to claim 1, further comprising:
   a detection circuit configured to output a voltage corresponding to the image density based on the detection result of the optical sensor; wherein
   when the sheet housing section is mounted into the image forming apparatus, the determination section is connected with the optical sensor through the detection circuit to determine the size of the sheet housed in the sheet housing section based on the voltage output from the detection circuit.

4. The sheet feed apparatus according to claim 3, wherein the determination section determines that the sheet housing section is not mounted into the image forming apparatus based on the output of the detection circuit.

5. The sheet feed apparatus according to claim 1, wherein the optical sensor is positioned at a position facing the marker in a state in which the sheet is housed at a sheet reference position determined according to the sheet size and the guide is positioned at sheet regulating position for regulating a deviation of the sheet.

6. The sheet feed apparatus according to claim 1, further comprising:
   a cleaner configured to clean the markers by interlocking with the guide.

7. The sheet feed apparatus according to claim 1, wherein
the interlocking support section includes a first support section connected with the first guide, and a second support section connected with the second guide, and
the optical sensor is arranged at a position where the first support section intersects with the second support section.

8. A sheet housing apparatus comprising:
a guide configured to be arranged at a position corresponding to the size of a sheet housed in a sheet housing section, the guide comprising a first guide which moves inside in the sheet housing section in a first direction, and a second guide which moves inside in the sheet housing section in a second direction orthogonal to the first direction;
an optical sensor having a varying optical sensor detection position that varies according to the size of the sheet while interlocking with the guide, the optical sensor being arranged on an interlocking support section which is interlocked with the first guide and the second guide; and
a plurality of markers that are spatially separated from each other, the plurality of markers having different image features corresponding to different sheet sizes, each of the plurality of markers being positioned at a respective fixed position associated with a respective sheet size, the respective fixed position being identical to the varying optical sensor detection position, the plurality of markers being arranged at the bottom surface of the sheet housing section.

* * * * *